United States Patent [19]

Schmid

[11] Patent Number: 4,553,240
[45] Date of Patent: Nov. 12, 1985

[54] GAS LASER WITH A SPRING-SUPPORTED CAPILLARY

[75] Inventor: Rudolf Schmid, Ottobrunn, Fed. Rep. of Germany

[73] Assignee: Siemens Aktiengesellschaft, Berlin and Munich, Fed. Rep. of Germany

[21] Appl. No.: 640,079

[22] Filed: Aug. 13, 1984

[30] Foreign Application Priority Data

Aug. 18, 1983 [DE] Fed. Rep. of Germany ....... 3329872

[51] Int. Cl.[4] .............................................. H01S 3/03
[52] U.S. Cl. ......................................... 372/61; 372/65
[58] Field of Search ....................... 372/61, 34, 33, 65, 372/64, 62

[56] References Cited

U.S. PATENT DOCUMENTS

| | | | |
|---|---|---|---|
| 3,686,584 | 8/1972 | Wahl | 331/94.5 |
| 3,904,986 | 9/1975 | Hernqvist | 331/94.5 G |
| 3,988,698 | 10/1976 | Crane et al. | 372/65 |
| 4,081,762 | 3/1978 | Golser et al. | 331/94.5 |
| 4,238,743 | 12/1980 | Golser et al. | 372/61 |
| 4,351,053 | 9/1982 | van den Brink | 372/61 |
| 4,352,185 | 9/1982 | Crane | 372/29 |
| 4,375,688 | 3/1983 | Taguchi | 372/65 |

Primary Examiner—William L. Sikes
Assistant Examiner—Léon Scott, Jr.
Attorney, Agent, or Firm—Mark H. Jay

[57] ABSTRACT

In a coaxially constructed gas laser with a capillary fused at one end to the glass casing surrounding it and enclosed at its free end by a supporting spring the supporting spring contains a perforated disc of a material adapted thermally to the jacket glass and is framed by a shrunk-on jacket constriction. Such a mount is extraordinarily stable mechanically and thermally. In a preferred embodiment the supporting spring is a multipart spring: attached to the thermally adapted perforated disc are two other, smaller perforated discs consisting of a spring material of temperature constancy and containing the actual spring elements.

11 Claims, 3 Drawing Figures

GAS LASER WITH A SPRING-SUPPORTED CAPILLARY

BACKGROUND OF THE INVENTION

The invention relates to a gas laser. Such a laser tube is described in U.S. Pat. No. 3,988,698.

In a known laser design a cylindrical glass jacket equipped with metallic end plates encloses a glass capillary and a hollow, cold cathode. The capillary has a flared end, at which it is fused to the glass jacket and one end plate; the other cathode end—projecting slightly into the cathode cavity—is kept in place by a supporting spring pushed over it. This spring is pushed against a circular jacket constriction by the cathode which in turn is sprung against the other end plate by an elastic lead.

Such a laser is relatively easy to assemble and also quite rugged mechanically. However, in the event of severe jarring the supporting spring may be driven out of its original position and remain dislodged, assuming a new position in which it slightly tips the axis of the capillary. The reflectors are then no longer optimally alignd, with the consequence that the laser performance declines. Such misalignments could largely be avoided by making the tolerances of the affected parts and surfaces very close; but this would be a considerable burden on production.

A particularly shockproof design results from replacing the spring by a glass disc, such as provided in the U.S. Pat. No. 3,904,986, and soldering or fusing this disc to the capillary and to the jacket. This design has not been used because the cost is too high and the resonator may become detuned due to thermal distortions.

It has also been proposed to clamp the free end of the capillary by a glass or metal nipple emanating from the adjacent end plate (see DE-OS No. 30 37 153 or U.S. Pat. No. 4,352,185). Such a mounting can stand even hard knocks and allows for thermal expansion differences. However, the capillary cannot be utilized over its entire length, it tends to vibrate and sag, and that most likely must communicate with the ballast chamber through a side opening, which renders ignition more difficult.

The object of the invention is to provide a gas laser which is of simple design and performs with consistancy even under great mechanical and thermal stresses in a temperature range from 20° C. to 300° C.

SUMMARY OF THE INVENTION

In accordance with the invention, the jacket constriction serves not as a stop surface, but as a mounting for the perforated disc. This design is stable because the jacket is shrunk on so that there is an intimate contact between it and the perforated disc over the entire circumferential area. Tests have shown that when suitable process temperatures are selected the glass sinters on, a process in which no regular fused connection originates, but in which considerable adhesive forces are developed. The spring is then anchored so firmly that it can without problems, also support the cathode—either alone or together with other support aids.

If the laser must operate under particularly rough environmental conditions, one should also generate in the spring mount compressive forces and/or enlarge the contact area between spring and jacket. It is recommended for this purpose to use a perforated disc material which expands less than the jacket glass when temperatures are increased, or to provide the outer rim of the disc with an annular web.

The spring elements should always be made of a material with high temperature stability, so that they remain fully elastic after the tube is baked out. However, spring alloys like certain steels or Co/Ni/Cr compositions are thermally not adapted to some of the usual jacket glasses. In such cases it is recommended to make the spring a multipart spring and to let the perforated disc function as a transitional element between the jacket and the actual spring component.

BRIEF DESCRIPTION OF THE DRAWINGS

The suggested solution will now be explained in greater detail by way of preferred embodiments illustrated schematically in the annexed drawings. In the Figures, identical parts have the same reference symbols.

BRIEF DESCRIPTION OF PREFERRED EMBODIMENTS

Figure 1:
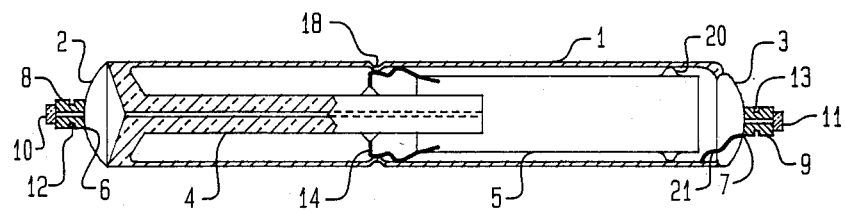
FIG. 1 shows a gas laser according to the invention in a longitudinal section.
Figure 2:
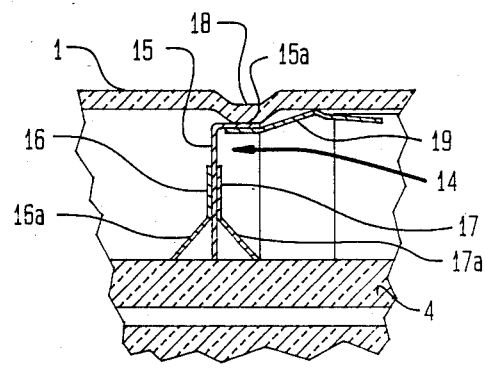
FIG. 2 a cutout from FIG. 1.

The gas laser of FIGS. 1 and 2 is intended for beam generators which must be installed in the vicinity of severly vibrating machines (not shown). The tube is of coaxial design and contains a cylindrical glass jacket 1 closed at both ends by metallic end caps 2 and 3 and enclosing a capillary 4 and a hollow cathode 5.

Each end cap has a center hole 6, 7 through which is pushed from the outside a tubular reflector carrier 8, 9. The outer end of each carrier 8, 9 serves as a mount for a reflector body 10, 11 provided on its inside with a partially or fully reflecting mirror film (not shown). To permit adjustment of the two bodies 10, 11 relative to the axis of the capillary 4, each reflector carrier contains a weakened wall zone 12, 13 which is permanently plastically deformable.

One end of the capillary 4 has a flare which is fused to the glass jacket 1 and the end cap 2. The other end of the capillary 4 is enclosed by a supporting spring 14 pushed over it. As may be seen best in FIG. 2, this spring 14 contains a first perforated disc 15 extending perpendicular to the axis of the capillary 4, and two smaller perforated discs 16, 17, each touching and attended to one side of the disc 15 as by spot-welding. The outer periphery of disc 15 supports annular flange 15a oriented coaxial with the glass jacket 1. This flange 15a is held in place by a constriction 18 in the jacket 1. The discs 16 and 17 each have central outwardly bent spring tabs 16a, 17a which surround the capillary like clamping rings.

In addition, the supporting spring 14 serves as holding means for the cathode 5. For this purpose it contains several fingers 19, each emanating from the flange 15a to the inner wall of jacket 1, whence they go after a bend into the cathode cavity and are saddled in where they contact the cathode 5. The other end of the cathode 5 is supported by humps 20. A lead 21 connected the cathode 5 to the end cap 3. The end cap 2 serves as an anode.

Both jacket 1 and capillary 4 consist of a glass marketed by the Schott Company under the designation "8250" and having an alpha value of $50 \times 10^{-7}$° K.$^{-1}$. The larger perforated disc 15 is of a Ni/Fe/Co alloy thermally adapted thereto ($Ni_{28}Fe_{54}Co_{18}$), and a Ni/Co/Cr alloy was selected for the smaller perforated discs 16, 17. The other tube components consist of materials such as are named in the DE-PS No. 25 06 707. This patent also describes how all these components are joined to each other to be vacuum-tight.

The materials are chosen such that where $\alpha_1$ equals the coefficient of thermal expansion of the jacket 1 and $\alpha_2$ equals the coefficient of thermal expansion of the disc 15, $$\left| \frac{\alpha_2 - \alpha_1}{\alpha_1} \right| \leq .1, \text{ and}$$

preferably $$\left| \frac{\alpha_2 - \alpha_1}{\alpha_1} \right| \leq .04.$$

The gas laser may be manufactured in the following manner:

First the capillary 4 is fused to the jacket 1 and to the jacket closure on the side of the anode 2. Then spring 14 and cathode 5 are inserted, and the jacket closure 3 on the cathode side is attached and fused to the jacket 1. In this production phase the jacket 1 and the reflector carrier 9 on the cathode side are clamped. In the same clamping step the constriction 18 is produced by bringing the respective jacket zone to temperatures between 900° C. and 1000° C. by means of an open flame until it has a visocity of between $10^4$ and $10^{7.6}$ Poise. It is then pushed inwardly by turning the jacket 1 on the glass lathe against a piece of carbon. The other production phases are described in DE-PS No. 25 06 707.

Figure 3:
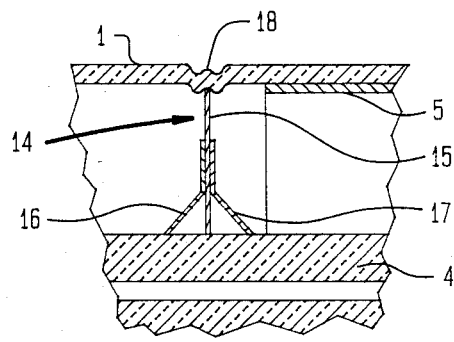
FIG. 3 the same cutout from a second embodiment.

The embodiment example of FIG. 3 differs from that of FIGS. 1 and 2 essentially only in that the web 15a and the fingers 19 are not present. This means the contact area between jacket 1 and perforated disc 15 is very much narrower. But this does not make the disc mount looser because the constricted jacket glass enclosed the disc 15 on both sides, as indicated in the Fig. In this particular case the cathode 5 consists of a coiled metal sheet whose own spring force presses it against the glass jacket 1 for which reason no additional fastening means are needed.

Those skilled in the art will understand that changes can be made in thhe preferred embodiments here described, and that these embodiments can be used for other purposes. Such changes and uses are within the scope of the invention, which is limited only by the claims which follow.

What is claimed is:

1. In an improved gas laser of the type having
a gas-filled casing which contains an elongated glass jacket,
a capillary enclosed by the jacket, one end of the capillary being permanently connected to the jacket while another end is supported by a supporting spring, the improvement comprising:
a perforated disc forming part of the spring, the disc extending perpendicular to the axis of the capillary, contacting an annular constricted zone of the jacket, and being made of a material which satifies a formula $$\left| \frac{\alpha_2 - \alpha_1}{\alpha_1} \right| \leq .1$$

where $\alpha_1$ equals a coefficient of thermal expansion of the jacket and $\alpha_2$ equals a coefficient of thermal expansion of the disc; and
an annular constricted zone in the jacket, said zone forming a shrink mount for the disc.

2. The improved laser of claim 1, wherein the jacket is cylindrical and $$\left| \frac{\alpha_2 - \alpha_1}{\alpha_1} \right| \leq .04$$

3. The improved laser of claim 1, wherein $\alpha_2 < \alpha_1$.

4. The improved laser of claim 1, wherein the disc further comprises an annular flange abutting said zone.

5. The improved laser of claim 1, wherein the spring further comprises at least one smaller disc which is perforated to surround the capillary and is attached to the perforated disc, the smaller disc being smaller than the perforated disc and being made of a material which has an elasticity which is substantially invarient with temperature.

6. The improved laser of claim 5, wherein each smaller disc is made of a Co/Ni/Cr alloy.

7. The improved laser of claim 1, further comprising at least one leaf spring secured to the perforated disc and engaging an open end of a cathode.

8. The improved laser of claim 7, wherein each leaf spring has a first leg extending from the perforated disc to an inner surface of the jacket and a second leg extending from said inner surface inside the cathode and bearing against it.

9. The improved laser of claim 1, wherein the jacket glass is a hard glass in which $\alpha_1$ approximately equals $50 \times 10^{-7}/°K$. and the perforated disc is made of a Ni/Fe/Co alloy.

10. A method for producing the improved laser of claim 1, comprising the steps of heating said zone until it has a viscosity between $10^4$ and $10^{7.6}$ Poise and pressing said zone inwardly.

11. The method of claim 10, wherein said viscosity is between $10^5$ and $10^6$ Poise.

* * * * *